United States Patent [19]

Higginson

[11] Patent Number: 5,444,890
[45] Date of Patent: Aug. 29, 1995

[54] LENS CLEANING DEVICES

[75] Inventor: Timothy B. Higginson, Highland Park, Ill.

[73] Assignee: Yuvee Company, Highland Park, Ill.

[21] Appl. No.: 195,151

[22] Filed: Feb. 14, 1994

[51] Int. Cl.⁶ .......................................... G02C 13/00
[52] U.S. Cl. .................................... 15/214; 15/209.1
[58] Field of Search .................. 15/208, 209.1, 210.1, 15/214, 218, 218.1, 220.3, 220.4, 223, 224

[56] References Cited

U.S. PATENT DOCUMENTS

| | | | |
|---|---|---|---|
| 399,450 | 3/1889 | Thorpe | 15/214 |
| 698,853 | 4/1902 | Pigueron | 15/214 |
| 1,003,761 | 9/1911 | Lehmann | 15/214 |
| 1,091,396 | 3/1914 | Serres | 15/214 |
| 1,172,718 | 2/1916 | Lennards | 15/214 |
| 1,202,774 | 10/1916 | Barnett | 15/214 |
| 1,871,208 | 8/1932 | Bouchard | 15/220.4 |
| 1,973,984 | 9/1934 | Hondeville | 15/208 |
| 2,055,314 | 9/1936 | Seburger | 15/214 |
| 2,253,269 | 8/1941 | Gaddis | 15/220.4 |
| 2,458,015 | 1/1949 | McDonald | 15/214 |
| 2,490,636 | 12/1949 | Klein | 15/214 |
| 2,517,089 | 8/1950 | Dean | 15/220.4 |
| 2,554,630 | 5/1951 | Miller | 15/214 |
| 3,271,807 | 9/1966 | Cabot | 15/223 |
| 4,716,615 | 1/1988 | Whitehead et al. | 15/220.4 |

FOREIGN PATENT DOCUMENTS

| | | | |
|---|---|---|---|
| 1439144 | 4/1966 | France | 15/220.4 |
| 167364 | 4/1921 | United Kingdom | 15/218.1 |
| 439086 | 11/1935 | United Kingdom | 15/218 |

*Primary Examiner*—Mark Spisich
*Attorney, Agent, or Firm*—Leydig, Voit & Mayer

[57] ABSTRACT

A device for cleaning lens including first and second flaps including a non-lens-scratching supple material. Each flap being substantially the size of a standard eyeglass lens and including an end region and a center neck region. A main piece joins the first and second flaps at the neck region and hold the flaps in place one against the other.

15 Claims, 3 Drawing Sheets

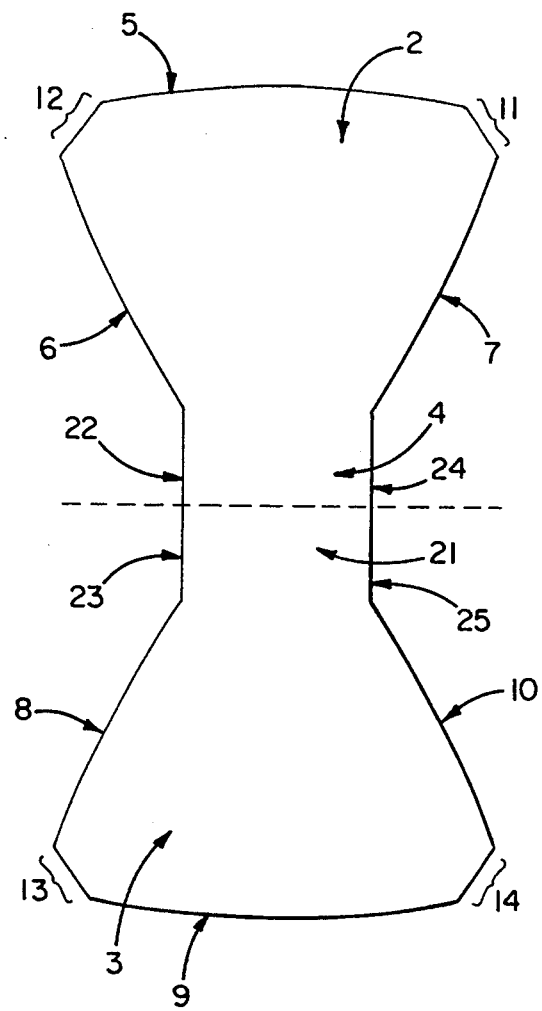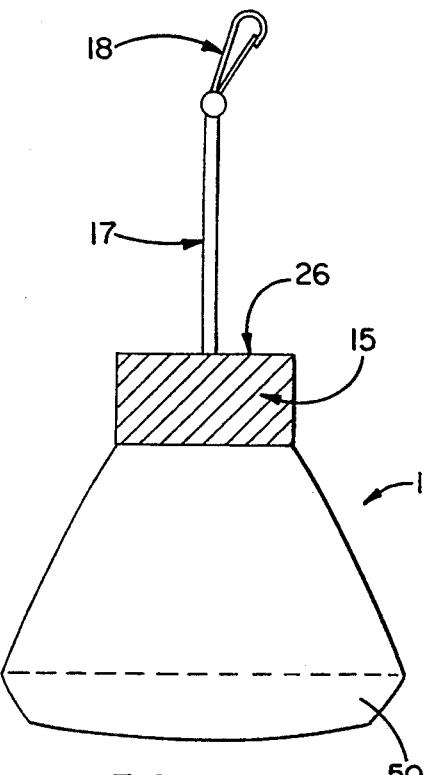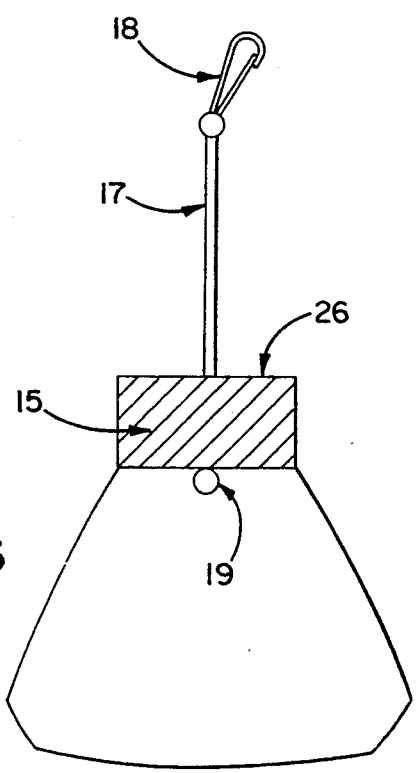
FIGURE 1
FIGURE 2
FIGURE 3

5,444,890

LENS CLEANING DEVICES

TECHNICAL FIELD

The present invention relates to an apparatus which permits various surfaces to be quickly and easily cleaned. In particular, the present invention relates to an apparatus which allows small smooth surfaces, for example glass lenses for use in eyewear such as sunglasses and eyeglasses, to be quickly and easily cleaned.

BACKGROUND ART

Numerous styles and types of eyeglass and sunglass lens cleaning devices are known. Generally, they fall into three types: (1) mechanical cleaners, (2) cloth cleaners in hard cases, and (3) cleaners made exclusively of soft or pliable materials (hereinafter referred to as "cloth cleaners"). These conventional lens cleaning devices have numerous drawbacks.

Mechanical cleaners tend to be bulky and somewhat complex to use. A bulky item tends not to be carried around. A item that is complicated to use tends not to be used. A further deficiency with mechanical cleaners is that they have moving parts which can fail, thereby reducing reliability. Mechanical cleaners tend also to be hard to wash; lens cleaning devices require frequent cleaning because foreign particles such as dust on the cleaning surfaces can scratch a lens during the cleaning process.

Cloth cleaners in hard cases, such as in U.S. Pat. No. 1,202,774, also tend to be bulky. Bulk is disadvantageous for eyeglass and sunglass cleaners because people like to have these cleaners in their pants or skirt pockets, in their pocketbooks, in their suit pockets and other places with limited space. In clothing pockets, bulky items are uncomfortable. Although the cases help keep the cloth clean (free of dirt, dust and other materials that might scratch or dirty a lens of a pair of glasses), the case is disadvantageous because the cloths must be removed from the case in order to use them. This takes extra effort and time which leads to less frequent use. Cloth cleaners in hard cases also require extra steps to wash the cleaning surfaces.

Finally, simple cloth cleaners generally come in square or rectangular flat pieces that have relatively large surface areas compared to the surface area of a standard eyeglass or sunglass lens. Eyeglass and sunglass lenses are rarely square or rectangular. These cleaners are easily misplaced and hard to find in pockets, bags or pocketbooks. They closely resemble handkerchiefs to the eye and to the touch which increases the danger of foreign particles getting on their surfaces. These cleaners also do not distinguish between surfaces; there is no inside or outside surface. Since these cleaners do not provide defined surfaces, they tend to soil quickly on all their surfaces. A first surface which absorbs oils from the hands on a first cleaning becomes the surface applied to the glasses on subsequent cleanings. Thus, on subsequent cleanings, the oil transferred to the first surface is thereafter transferred to the glass lenses.

Some cloth cleaners come in patterns that resemble somewhat the shape of lenses such as in U.S. Pat. Nos. 399,450; 2,554,630; and 1,091,396. U.S. Pat. 399,450 has a folded shape with a different fabric on each surface. However, that device (and the above-referenced U.S. Pat. No. 1,202,774) has nothing to hold it in its folded shape. Hence there is no readily identifiable inside or outside surface. These devices can lie flat in an unfolded position. The surface that is intended to be the inside, cleaning surface can get dirty just as easily and quickly as the outside surface because nothing prevents the device from unfolding.

U.S Pat. Nos. 2,554,630 and 1,091,396 are devices that are stitched to form pockets; the opening is smaller than the stitched parts which requires a carefully fitting of the lens or lenses into the pocket for cleaning. An undesirable amount of unnecessary time and attention is required to fit the lenses into the pocket. Further, the pocket may not be adaptable to other types of eye wear lenses such as those used for safety goggles. Further, these types of pockets are difficult and costly to manufacturer.

SUMMARY OF THE INVENTION

A principal object of the present invention is to provide an effective eyeglass and sunglass lens cleaner.

Additional objects of the present invention include providing an eyeglass cleaner that is non-complicated, lightweight, sized to approximate lens sizes, rugged, machine washable, easy to manufacture, easy-to-use, easy-to-recognize, easy-to-clean, easy-to-have-at-hand, shaped for lens shapes, predictable as to the clean side of the cloth and that keeps the clean side free of foreign particles.

Accordingly, the present invention provides a lens cleaning device including first and second flaps made from a non-lens-scratching supple material. Each flap being substantially the size of a standard eyeglass lens and including an end region and a center neck region. A main piece joins the first and second flaps at the neck region and holds the first and second flaps against the other. This arrangement provides a soft cloth or cloth-like material for wiping lenses, such as eyeglass or sunglass lenses. In operation, the invention may be utilized to clean one lens at a time. The user places the lens between the two flaps and moves the two inside cloth surfaces over the lens by means of movement of the user's fingers. Thus, both sides of a lens may be cleaned at one time.

BRIEF DESCRIPTION OF THE DRAWINGS

FIG. 1 is a top view of an exemplary pattern which may be utilized as flaps;

FIG. 2 is a broadside front view of one embodiment of the invention;

FIG. 3 is a broadside rear view of the embodiment of the invention shown in FIG. 2;

DESCRIPTION OF THE PREFERRED EMBODIMENTS

Figure 4:
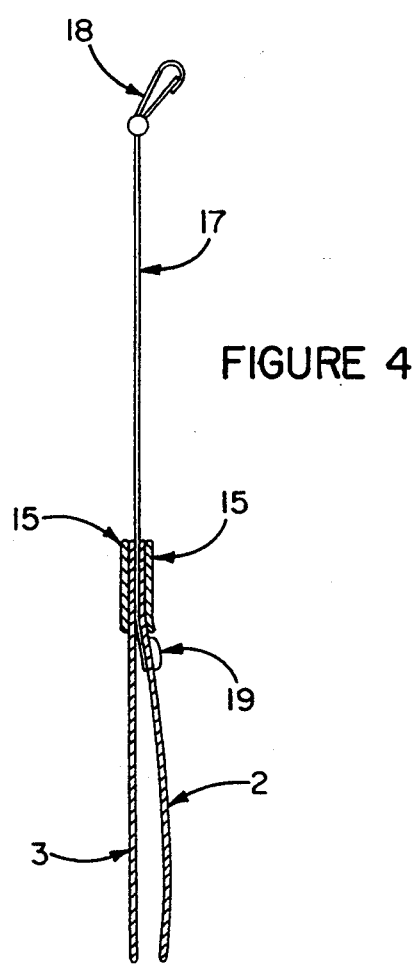
FIG. 4 is a side view of the embodiment of the invention shown in FIG. 2.

Devices embodying the present invention may be used to quickly and reliably clean a wide variety of items, including lenses. For example, the lenses may comprise sunglasses, eyeglasses, goggles, spectacles, and other optical lens systems.

As shown in FIGS. 1 and 2, one example of a device embodying the invention incorporates, for example, a main piece 15 and first and second flaps 2,3.

Referring to FIG. 2, a first exemplary lens cleaner 1 may include a main piece 15 and a plurality of downwardly extending flaps. In the illustrated embodiment, first and second flaps 2,3 are shown as extending from the main piece 15.

The first and second flaps 2,3 may be variously configured to include a plurality of different shapes, sizes and materials. For example, the flaps 2,3 may be shaped in the form of circles, ovals, squares, rectangles, trapezoids, diamonds, teardrops, Ts, and/or paddles, and modified versions of these shapes having, for example, rounded corners, arched sides, and/or concave portions. The first and second flaps may include any suitable materials including, for example, wools, wool blends, polyesters, polyester blends, polypropylene, chemically treated fabrics (including hydrophyllic treated fabrics), nylons, cottons, and other breathable and non-breathable fabrics including fleeces, felt and terrycloth. In a preferred embodiment, the flaps include a non-lens-scratching supple material which helps to evaporate a cleaning liquid such as fleeces.

The flaps may be substantially the size of standard eyeglasses. The flaps 2,3 may be configured in a plurality of widely varying sizes, and may range from 1 to 4 times the size of a typical eyeglass lens. In a preferred embodiment, the flaps 2,3 are slightly larger than a large eyeglass or sunglass lenses providing some additional material for wiping the surfaces. Typically a large eyeglass or sunglass lens ranges from 5 to 8 centimeters across and many are about 6 centimeters. In exemplary embodiments, each flap may range in size from about 2 to 20 centimeters in width, and preferably between 4 and 17 centimeters in width, and more preferably between 6 and 14 centimeters in width and even more preferably between 7 and 12 centimeters in width and most preferably about 10 centimeters in width. In exemplary embodiments, each flap may range in size from about 3 to 20 centimeters in height, and preferably between 4 and 17 centimeters in height, and more preferably between 5 and 15 centimeters in height and even more preferably between 8 and 12 centimeters in height and most preferably about 10 centimeters in height. The flaps are preferably sized such that the portion extending from the neck has a height about the size of a large eyeglass or sunglass lens (i.e., within about 1 to 7 cm of the size of a large eyeglass lens). This allows the flaps to be fully functional, yet compact, without significant amounts of extra material.

In a preferred embodiment, the flaps 2,3 may include two substantially identically-shaped pieces. In one embodiment, each flap includes a rounded, equilateral triangle with a central, rectangular neck 4,21. Each of the triangular flaps may include three sides 5,6,7,8,9,10 bowed out into an arc.

In a preferred embodiment, the flaps 2,3 may be shaped to conform to the most common eyeglass and sunglass lens shapes. Each flap may be a shape derived from an equilateral triangle whose sides have been bowed out to make each side of the triangle form an arc. Two of the corners of the triangular flaps may be rounded off from the vertices to give two smaller corner arcs that allow for precise cleaning of smaller or difficult to reach areas of the lens such as areas immediately adjoining the frame, especially near the noseguard. In this embodiment, the flaps 2,3 are substantially mirror-images and include a neck portion. If two separate flaps are used, when the flaps are placed together, the flaps preferably substantially match up. If a single piece of material is used, when the cloth is folded in two, the triangular flaps preferably substantially match up.

Rounding the corners of the flaps 2,3 has an added advantage of preventing sharp corners of cloth that tend to be looser, fold over, catch in things, and get dirty. Additionally, the rounded shape provides a pleasing appearance to the user.

The angle of the bow at the point of the vertices is preferably in the range of about zero to twenty degrees from a straight line, and most preferably six-to-seven degrees from a straight sided triangle. Thus, the sides of the triangle may be arc shaped and diverge from a straight sided triangle by, for example, 0.1 to 2 centimeters, and more preferably 0.2 to 1 centimeters, and most preferably 0.3 to 0.5 centimeters. In this embodiment, each corner of the triangular flap has an angle of approximately seventy-two degrees compared with the sixty degree angle of an equilateral triangle.

In one embodiment, the corners 11,12,13,14 of each of the triangular flaps 2,3 that do not form the neck are preferably rounded off in the range of one to twenty millimeters from the point of the vertices, and most preferably ten millimeters from the point of the vertices.

In the exemplary embodiment, the size of the triangular flaps 2,3 is preferably three to twenty centimeters, and most preferably ten centimeters to a side. The sides of the neck 22,23,24,25 may be preferably two- to-ten centimeters long, and most preferably forty-five millimeters long, and preferably twenty to fifty millimeters wide, and most preferably forty-two millimeters wide. The neck portion may, for example, be rectangular shaped and take the place of the third corner of each of the two triangular flaps.

Although the flaps 2,3 may include shapes in the form of circles, ovals, squares or rectangles with various sizes, these shapes and other sizes do not conform well to the general shape of eyeglass and sunglass lenses. The modified triangular flaps at the aforementioned dimensions are preferred. Additionally, the rounded corners 11,12,13,14 of the triangular flaps facilitate cleaning because the rounded corner can fit close to the rims of the glasses and are about the size and shape of the tip of a finger—and it is the tip of the finger that is used to put pressure on the cloth to clean the lens portion that is tight against the rim of the glasses.

Preferably the range of dimensions for the neck in the illustrated embodiment are a neck width of about 25 to 65 millimeters, a neck height of about 15 to 35 millimeters, a top-of-the-neck to the outer edge of the flap distance of about 80 to 120 millimeters, and flap edge lengths of about 20 to 120 mm. Most preferably, the dimensions of the neck are a width of 50 millimeters, a height of 25 millimeters, a length from top-of-the-neck to the outer edge of the flap of 95 millimeters and flap edge lengths of 70 millimeters.

Additionally, in a preferred embodiment, the flaps 2,3 are made of a Malden Mills Polartec Fleece Series 200. This is a double-sided, polyester fabric. Preferably, the fabric of the flaps 2,3 has the following properties: very soft, does not scratch lenses, easily washed, very quickly dried, does not adsorb water, and is rugged. The Polartec Fleece Series 200 meets these requirements having been designed for outwear and athletic garments. It does not absorb water.

Additionally, the material used for the flaps 2,3 preferably is a material that, when cut, has a clean finished edge with no additional stitching or folding required to finish the edge or to prevent the material from unravelling or otherwise coming undone.

The main piece 15 may be variously configured include a plurality of different shapes, sizes and materials. For example, the main piece 15 may be shaped to fit in the palm of a user's hand, and may include cylindrical, squares, egg shapes, round shapes, or other handle like shapes and modified versions of these shapes having, for example, rounded corners, arched sides, and/or concave portions. For example, the main piece 15 may range in size from 1 to 12 centimeters in width, and preferably between 2 and 10 centimeters in width, and more preferably between 3 and 8 centimeters in width and even more preferably between 4 and 6 centimeters in width and most preferably about 5 centimeters in width. The main piece 15 may range in size from 1 to 6 centimeters in height, and preferably between 1.5 and 4 centimeters in height, and more preferably between 2 and 3 centimeters in width and even more preferably about 2.5 centimeters in width. The main piece 15 may include any suitable materials including, for example, wools, wool blends, polyesters, polyester blends, polypropylene, chemically treated fabrics (including hydrophyllic treated fabrics), nylons, cottons, and other breathable and non-breathable fabrics including fleeces, felt and terrycloth, as well as rigid materials such as plastics, metals, woods, etc,. In a preferred embodiment, main piece 15 includes nylon webbing disposed around the flaps 2,3.

In the illustrated embodiment, the shape of the neck 4,21 is a substantially flat-sided rectangle which forms a top 26 which may also be substantially flat as shown in FIG. 2. The sides and top of the main piece 15 may alternatively be curved. However, in the embodiments where the main piece 15 is a tougher, less pliable, more rigid material such as a fabric, the curved shape may increase manufacturing difficulty. For example, although the top 26 could be curved or rounded, a straight top again reduces manufacturing costs when the main piece 15 is stitched because it is easier to stitch straight lines.

Figure 10:
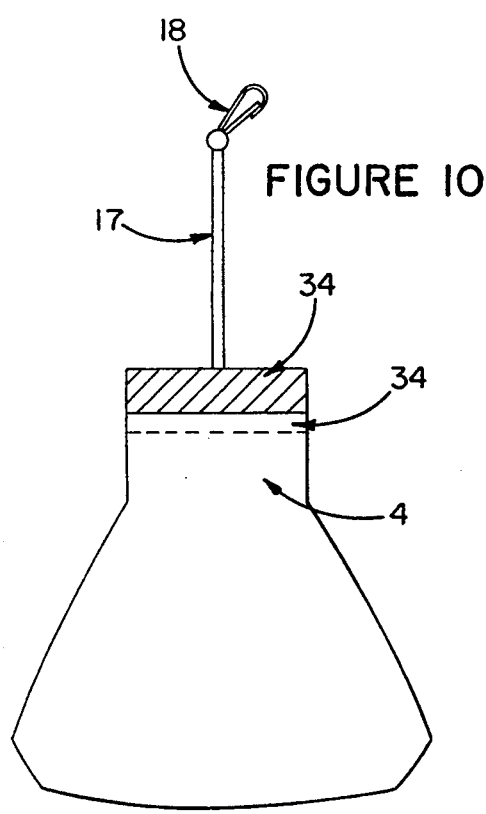
FIG. 10 is a broadside front view of a fourth embodiment of the invention.

In a separate embodiment, a piece of water-absorbing fabric 34 could be attached under the webbing to protrude out of the top 26 of the lens cleaner 1. The fabric 34 extending from the top of the lens cleaner 1 is, for example, shown in FIG. 10. This fabric is preferably a water absorbing fabric such as terry cloth. The fabric 34 may be soaked in a lens cleaning solution or in water and used to wet the surface of the lens. The flaps 2,3 may then be used to remove the cleaning solution as well as any dirt. The cleaning solution would quickly evaporate from the flaps 2,3 when, for example, a wicking fabric, such as fleece, is used for the flaps.

In alternative embodiments, other non-lens-scratching fabrics may be used in place of fleece. For instance, specialty lens-care fabrics that could be used. Many of these fabrics have very little body and hence are not preferred for use with the lens cleaner 1. A fabric without significant body may have difficulty staying closed so that the two inside surfaces of the flaps 2,3 face each other and keep the inside surfaces of the flaps clean.

Figure 8:
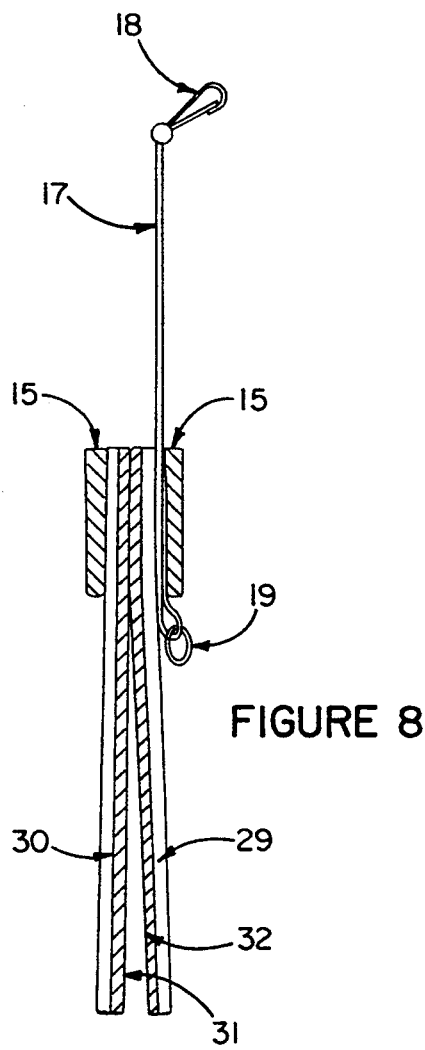
FIG. 8 is a side view of a second embodiment of the invention.

In one embodiment of the invention, for example, as shown in FIG. 8, the flaps 2,3 may include a plurality of layered materials. In this embodiment, an inside layer could include a specialty lens cleaning fabric and the outer layer could include a fabric with more body, styling and distinctive touch such as fleece.

An outer layer 29,30 may include a material impervious to body oils that are secreted by the hands and fingers but that would still "breath" thereby allowing the inside surfaces 31,32 to dry if they get wet or are wetted in the process of cleaning a lens. This configuration is advantageous over conventional lens cleaning devices in that the internal surface may still quickly evaporate lens cleaning solution through the exterior surface while the exterior surface prevents oils from soiling the interior surface. Layers 29, 32 may be integrally bonded together or two separates flaps which may or may not be coupled by sewing.

The outer layer could include a relatively rigid outer shell having a foam disposed between the cleaning fabric. The outer shell may clamp shut to keep the inner fabric clean. However, this embodiment is not preferred because the ridged outer shell increases the difficulty of wiping the lens than a more pliable exterior layer. Further, more rigid casings may be disadvantageous because they are bulky, uncomfortable when carried in pockets, and difficult to wash.

In one exemplary embodiment shown in FIG. 2, it may be desirable to include a piece of fabric disposed around the edge of one of the triangular flaps, for example 5,11,12 or 9,13,14, which folds over an outer edge of one of the flaps 2,3 to form a pouch-like closure 50. The second flap may then be inserted into the pocket like closure. This would help seal the inside surfaces from dirt and particles, but would still allow ease of use and ease of cleaning. It would also omit the bulk of a ridged shell while providing much of the functionality. The edging fabric could be slightly elastic. However, too strong an elastic would cave the flaps in on themselves. This embodiment is preferably used with the multi-layered flaps so that the stitching around the edges of the flap with the overlaped piece does not protrude through to the cleaning surface and provide a potential rough element which could scratch lenses or catch dust or particles. However, the preferred embodiment does not have the overlap and does not have stitching or finishing folds around the edges of the flaps.

In the embodiment shown in FIG. 2, the main piece 15 may, for example, be a semi-rigid material (such as heavy cloth) wound horizontally around the neck portion of the flaps 2,3. In this manner, the semi-rigid material may encircle the neck portion of the flaps 2,3 and be fastened thereto by any suitable means including stitching. The main piece 15 provides stability to the lens cleaner 1 by adding rigidity and weight to one end of the flaps 2,3 so that holding the lens cleaner 1 is easier. Further, the main piece 15 holds the flaps 2,3 folded keeping dirt away from the inside surfaces.

In a preferred embodiment, the main piece 15 is made from a semi-rigid material such as a nylon or polypropylene webbing. This webbing is commonly used on bags for strapping or handles, by mountain climbers for harnesses, and on other athletic equipment. The webbing provides the stability of a more rigid material for the neck of the lens cleaner 1. The webbing provides sturdiness for rigorous outdoor use, a friction surface providing a secure grip, and a washable material allowing the lens cleaner 1 to be washed in the washing machine. The neck region 4,21 is preferably more rigid than the flaps 2,3. In this manner, the neck forms a backbone enabling the lens cleaner 1 to retain its structure. The main piece 15 may also be formed using other suitable materials. However, lighter, more flexible materials are not preferred since the lens cleaner 1 may flop loosing its shape and be difficult for a user to hold in place.

In an alternative embodiment, the main piece 15 may include a rigid material such as plastics, metals, woods, or composites. The embodiment using a rigid material provides a very strong handle for griping the lens cleaner. However, a rigid material may prevent or prolong the drying process of the neck portion of the flaps 2,3. The use of a rigid material may also be disadvantageous for machine washing the lens cleaner 1. Further, a rigid main piece 15 may require additional up-front manufacturing costs and complexity.

The main piece 15 may also contain a pocket for holding a small bottle, such as a spray bottle, of lens cleaning solution. In this manner, the small bottle can add to the weight and structure of the main piece 15 while always providing the user with ready access to a lens cleaning solution. Often, the lens cleaner 1 and the lens cleaning solution become separated in, for example, handbags. By providing a pocket for the lens cleaning solution in the main piece 15, the user has ready access to both the lens cleaning solution and the lens cleaner 1. If a spray bottle is utilized, the spray bottle preferably is disposed such that the spray top is exposed out of one side of the main piece 15. This configuration has the advantage that the user can spray the lens cleaning solution on the lenses and clean the lenses without substantially changing his grip on the lens cleaner 1. This configuration has significant advantages in terms of efficiency of operation of the lens cleaner 1.

Figure 9:
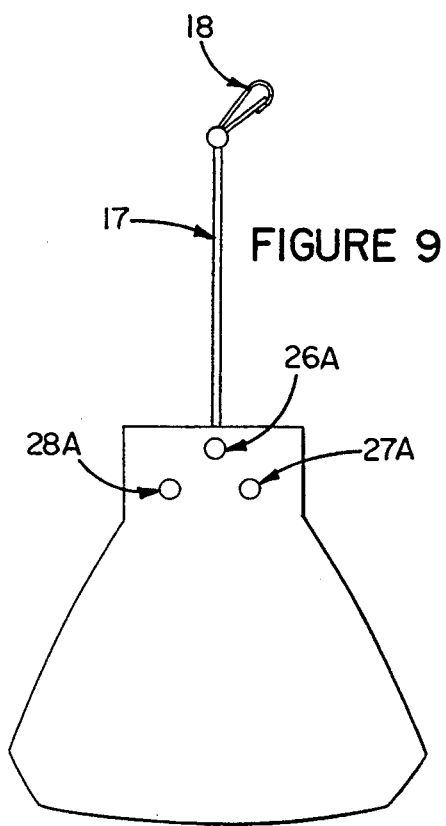
FIG. 9 is a broadside front view of a third embodiment of the invention.

Referring to FIG. 9, an alternative embodiment of the lens cleaner 1 may include attaching the flaps 2,3 together using, for example, one or more fastening devices 26A-28A. The fastening device may be variously configured to include grommets, snaps, buttons, velcro, other fastening devices. These embodiments are easy to manufacture, hold the flaps together, and provide an attachment point for a strap. However, they are less desirable then the embodiments having a main piece 15 because the structural base formed by the fastening devices is not as well suit as the main piece 15 for fitting into the palm of the user's hand and in providing structural support to the flaps.

Referring to FIG. 2, a strap 17 and a hook 18 may also be optionally coupled to the lens cleaner 1. The strap, may for example, range from 2 to 15 centimeters, and preferably between 3 and 10 centimeters, and more preferably about seven centimeters from the top of the lens cleaner 26 to the hook 18. As shown in FIG. 3, an eye 19 may also be coupled to the lens cleaner 15. If an eye 19 is coupled to the lens cleaner 15 it is preferably to couple the eye to the lens cleaner at the top of the lens cleaner near the main piece 15. the main piece 15 provides the user with a handle for easily manipulating the hook into the eye without trying to grasp the small eye. The eye is preferably small and placed adjacent to the main piece 15 to prevent the eye 19 from interfering with the cleaning motion and scratching the lenses. The strap 17 is preferably long enough to fit around objects such as bag straps, rear view mirror posts while still having the hook 18 snapping onto the eye 19. A strap that is too long may become unwieldy and give the lens cleaner 1 too much play when the lens cleaner 1 is attached by means of the hook alone. In a preferred embodiment, the hook 18 is small enough such that the hook 18 may be attached to a zipper such as a zipper on the outside of a garment or bag. In the exemplary embodiment shown in FIG. 3, the strap 17 extends from the top 26 of the main piece 15 and the eye 19 extends from the bottom of the main piece 15. In a preferred embodiment, both the strap and the eye are secured to the lens cleaner by the main piece 15. Having the strap extend from the top of the lens cleaner 1 is preferable because the user's hand can easily slide down the strap and grasp the main piece 15 in the correct position. Thus, this arrangement allows the lens cleaner 1 to be easily grasped even by a user wearing bulky mittens. Further, the lens cleaner can provide a dual purpose of providing a handle for locating and moving a zipper. This may be very helpful for older users, users wearing gloves, or users with vision impairments.

FIG. 4, a side view, shows the slimness of an embodiment of the lens cleaner 1. Completely uncompressed and unused, the main piece 15 may be the widest point. In one preferred embodiment, the main piece 15 is at about 5-7 millimeters in width. This may facilitate the storing the lens cleaner 1 in pockets, and to lie flat, out-of-the-way when attached to the outside of a garment or bag.

Figure 6:
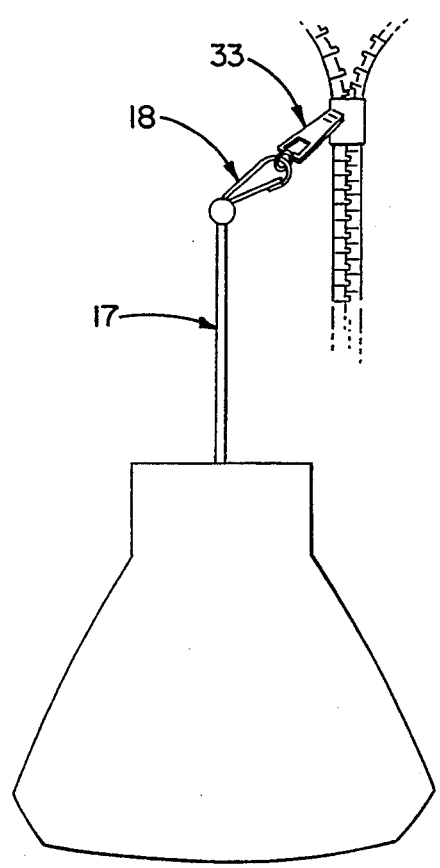
FIG. 6 is a prospective view of the embodiment of the invention shown in FIG. 2 attached to a zipper.
Figure 5:
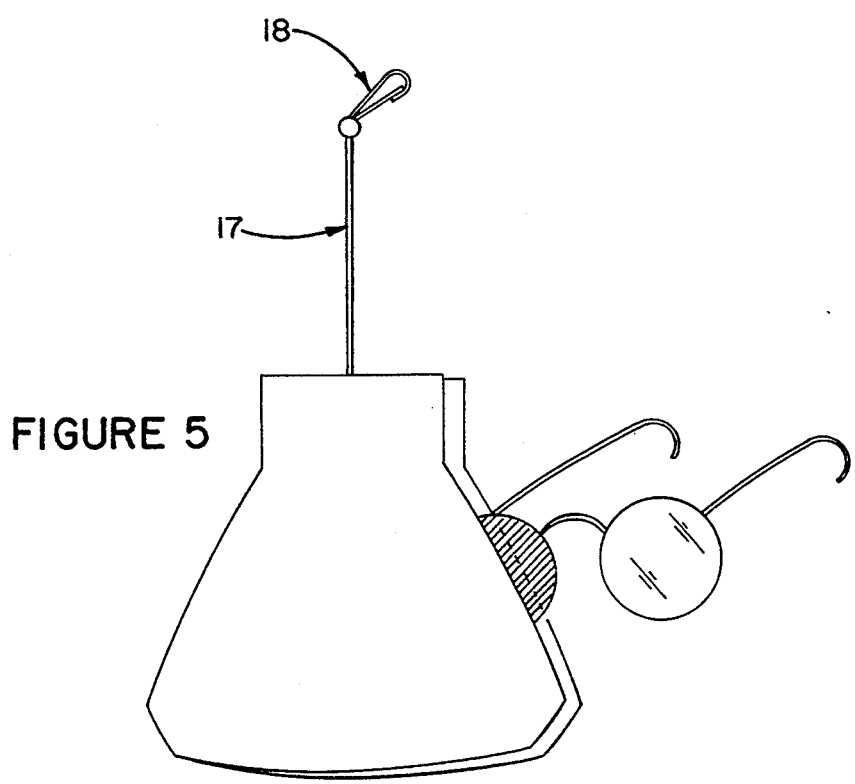
FIG. 5 is a prospective view of the embodiment of the invention shown in FIG. 2 in operation.
Figure 7:
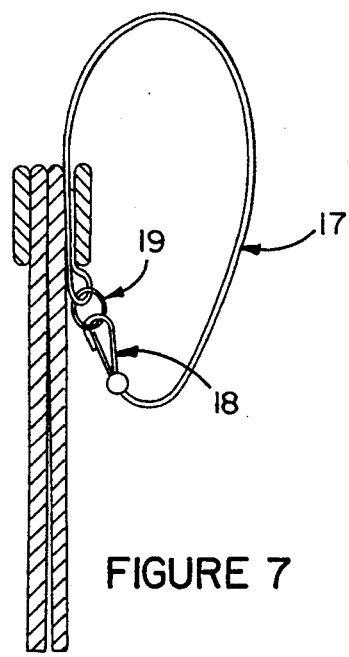
FIG. 7 is a side view of the embodiment of the invention shown in FIG. 2 where the hook is attached to the eye.

FIG. 5 shows the eyeglasses inserted between the two folds for cleaning. FIGS. 6 and 7 show the hook attached respectively to a zipper 33 and to the eye 19. There are numerous alternatives to the hook and eye fastener system. For example, a velcro fastener may be used on the end of the strap. However, the hook and eye offer an easy and secure mechanism to attach the lens cleaner 1 without fear of loss due to undesired release. Other fasteners include, for example, zippers, straps, posts, etc.

The strap is preferably disposed under the main piece 15. If the main piece 15 is a fabric material, then the strap is preferably sewn underneath the fabric material in the middle of the neck portion at the top 26 of the lens cleaner 1. In this position, the lens cleaner 1 may hang in a balanced, vertical position allowing easy grasping and insertion of a lens without unhooking the lens cleaner 1 from the point or object to which it is attached. Further, the length of the strap gives the user enough distance from the point of attachment (if there is one) for the lens cleaner 1 to be easily used without being so long as to make the lens cleaner 1 fall constantly in the way of the user when not in use.

When the strap is in the middle of the neck portion at the top 26 of the lens cleaner 1, the lens cleaner 1 hangs with the flap opening facing down. This keeps the flaps 2,3 closed and together thereby keeping the inside surfaces clean. The added weight of the main piece 15 at the neck portion provides hanging stability in that the lens cleaner 1 hangs straight down and its tendency to flop around is minimized. Additionally, the weight of the main piece 15 is at substantially a midpoint in the hanging lens cleaner, reduces any pendulum effect when the lens cleaner 1 is secured by the hook. The reduction in the pendulum effect serves to keep the flaps closed and together thereby keeping the inside surfaces clean.

The strap coupled to the main piece 15 also provides a clear tactile and visual clue as to which end is to be held for support and which end of the lens cleaner 1 does the cleaning. The user is given the means, recognizable and understandable at a virtually unconscious level, of the correct orientation of the lens cleaner 1. This hook and eye system also decreases the chance of permanent loss of the lens cleaner 1 and the chance of temporary loss of the lens cleaner 1 for instance in the depths of a handbag.

In operation, the main piece 15 makes the lens cleaner easier to use providing a place for the user to hold the lens cleaner 1 that is more rigid when placing a lens between the flaps 2,3. The main piece 15 fits in the palm of the hand and supports the lens cleaner 1 when a lens is being cleaned between the two flaps.

The size of the main piece 15 is designed to fit comfortably in the palm of the hand so that, in relation to the size of the flaps, the middle of the flaps to the outer edge of flaps rests approximately on the fingertips. This sizing provides a natural cleaning position with comfortable support provided by the palm-fitting main piece 15. The actual size used is a balance of factors that include the natural range of hand sizes, the size of lenses, the ease of use of a smaller flap size and the ease of carriage of a smaller device. The main piece 15 is preferably palm shaped and designed to fit is a slightly curled or closed palm having cupped fingers held in a position to manipulate the flaps over a lens surface. The main piece 15 is preferably semi-rigid and not so hard and tough as to be uncomfortable in the palm of the hand.

The main piece 15 holds the two flaps of the cloth together making an inside surface and an outside surface. The inside surface of each flap stays clean because it is held against the inside clean surface of the opposing flap. The outside surfaces may get dirty but the user always knows which is the inside and which is the outside surface.

In preferred embodiments, the flaps are not stitched on the open end portion opposite from the neck portion. This openness of the end portion allows easy entry for a lens and allows a lens to be maneuvered inside the flaps for cleaning at all angles and so that particular points on a lens can be cleaned by different parts of the flaps.

The distinctive shape of the lens cleaner 1 coupled with its two flaps and the different texture of the cloth and tougher material make the lens cleaner 1 easily distinguishable by eye and by touch from other items. Thus if a user is reaching into a handbag, the lens cleaner 1 is distinguishable immediately from all other items even without the user looking into the handbag.

While the invention has been described in some detail by way of illustration and example, it should be understood that the invention is susceptible to various modifications and alternative forms, and is not restricted to the specific embodiments set forth in the Examples. It should be understood that these specific embodiments are not intended to limit the invention but, on the contrary, the intention is to cover all modifications, equivalents, and alternatives falling within the spirit and scope of the invention.

I claim:

1. A lens cleaning device for cleaning a lens, the lens cleaning device comprising:
   first and second flaps including a non-lens-scratching supple material, each flap including an end region substantially the size of the lens and a neck region; and
   a main piece, sized for fitting in a palm, the main piece encircling the neck region of the first and second flaps and fixing the neck region of the first and second flaps together wherein the main piece includes a nylon webbing material.

2. The device of claim 1 wherein the main piece is of a heavier weight and more rigid construction than the non-lens-scratching supple material.

3. The device of claim 1 wherein a single piece of non-lens-scratching supple material is folded about a substantially middle portion thereof to form the first and second flaps.

4. The device of claim 1 wherein the first and second flaps are two separate pieces of non-lens-scratching supple material.

5. The device of claim 1 wherein the first and second flaps are equilateral triangles having sides substantially ten centimeters in length.

6. The device of claim 5 wherein each of the flaps include two corners, each corner being rounded with an arc substantially 1 centimeter from the corner of an unmodified equilateral triangle.

7. The device of claim 1 including a strap having first and second ends, the first end being coupled to the main piece for coupling the first and second flaps and main piece to an object.

8. The device of claim 7 including a hook disposed at the second end of the strap.

9. The device of claim 8 including an eye coupled to the main piece, wherein the hook is positionable to couple to the eye.

10. The device of claim 1 wherein the non-lens-scratching supple material is a polyester fleece.

11. The device of claim 1 wherein the flaps each include first and second major surfaces, the first major surfaces disposed opposed to each other and wherein each flap includes a layer of stronger, heavier weight fabric on the second major surface and a lens-cleaning fabric on the first major surface.

12. The device of claim 1 wherein the neck region of each flap is narrower than the end region of each flap.

13. A lens cleaning device for cleaning a lens, the lens cleaning device comprising:
    first and second flaps including a non-lens-scratching supple material, each flap including an end region substantially the size of the lens and a neck region; and
    a main piece, sized for fitting in a palm, the main piece fixing the neck region of the first and second flaps together wherein the first and second flaps are shaped as equilateral triangles having substantially arced sides and rounded corners.

14. A lens cleaning device for cleaning a lens, the lens cleaning device comprising:
    first and second flaps including a non-lens-scratching supple material, each flap including an end region substantially the size Of the lens and a neck region; and
    a main piece, sized for fitting in a palm, the main piece fixing the neck region of the first and second flaps together; and
    a water-absorbing material disposed under the main piece and extending out from the main piece in a first direction, wherein the first and second flaps extend from the main piece in a second direction, the first direction being opposite from the second direction.

15. The device of claim 14 wherein the water-absorbing material is terry cloth.

* * * * *